US006543508B2

(12) United States Patent
Koch (10) Patent No.: US 6,543,508 B2
(45) Date of Patent: Apr. 8, 2003

(54) COMPACT DISK LABELING, CLEANING AND REPAIRING SYSTEMS

(75) Inventor: Richard C. Koch, Rancho Santa Margarita, CA (US)

(73) Assignee: Labelwhiz.com, Inc., Rancho Santa Margarita, CA (US)

( * ) Notice: Subject to any disclaimer, the term of this patent is extended or adjusted under 35 U.S.C. 154(b) by 175 days.

(21) Appl. No.: 09/862,244

(22) Filed: May 22, 2001

(65) Prior Publication Data

US 2002/0174957 A1 Nov. 28, 2002

(51) Int. Cl.$^7$ .............................. B65C 1/00; B65C 1/02; B65C 9/26
(52) U.S. Cl. ................. 156/391; 156/556; 156/DIG. 2; 369/72
(58) Field of Search ................................ 156/391, 556, 156/574, 519, 580, DIG. 1, DIG. 2, DIG. 37, DIG. 42, 389; 369/72

(56) References Cited

U.S. PATENT DOCUMENTS

| | | | |
|---|---|---|---|
| 4,783,870 A | 11/1988 | Yeung | 15/97.1 |
| 5,228,022 A | 7/1993 | Compton et al. | 369/72 |
| 5,421,950 A | 6/1995 | Parrish | 156/579 |
| 5,537,706 A | 7/1996 | Baker | 15/97.1 |
| 5,584,089 A * | 12/1996 | Huang | 369/72 |
| 5,783,031 A | 7/1998 | Sievers | 156/556 |
| 5,783,033 A | 7/1998 | Grossman | 156/556 |
| 5,902,446 A | 5/1999 | Casillo et al. | 156/379.8 |
| 6,243,345 B1 * | 6/2001 | Kwang | 369/72 |
| 6,347,654 B1 * | 2/2002 | Koch | 156/391 |
| 6,408,918 B1 * | 6/2002 | Hummell et al. | 156/391 |

FOREIGN PATENT DOCUMENTS

| | | | |
|---|---|---|---|
| DE | 10015601 A1 * | 10/2001 | B65C/1/02 |
| EP | 0855713 A1 | 7/1998 | G11B/23/40 |

* cited by examiner

Primary Examiner—Richard Crispino
Assistant Examiner—Sue A. Purvis
(74) Attorney, Agent, or Firm—Kenneth W. Float (57) ABSTRACT

A compact disk labeling, cleaning and repairing system for use in applying an adhesive label to a surface of a compact disk, and for cleaning and repairing a readable surface of a compact disk. In an exemplary system, a top portion is used for labeling the compact disk and has a side wall with a shape that matches the shape of the compact disk and a flat shelf that forms an upper cavity. A plurality of tabs are formed around the periphery of the side wall that hold the compact disk above the label prior to attachment and which register the compact disk. The flat shelf has a plurality of slots therein that form a plurality of tabs, and a plurality of vertical projections extend away from the tabs to form a hub. The hub is sized to allow a central hole in the adhesive label to register thereto. The slots allow the tabs or hub to flex during application of the label. A bottom portion of the system may be used to clean and repair the compact disk. One or more pads are disposed on a lower surface the flat shelf that contact a non-readable surface of the compact disk and prevent substantial movement thereof during cleaning. The side wall adjacent the lower surface (or a central member) has a frictional or toothed surface. A cleaning tool comprises a rotatable cleaning member having a cleaning pad disposed thereon that contacts the compact disk is used with cleaning or repair solution to clean or repair the compact disk. The pad contacts and rotates relative to the frictional or toothed surface of the side wall (or central member) while the pad contacts the surface of the compact disk to clean or repair it.

8 Claims, 6 Drawing Sheets

COMPACT DISK LABELING, CLEANING AND REPAIRING SYSTEMS

BACKGROUND

The present invention relates to compact disks, and more particularly, to compact disk labeling, cleaning and repairing systems for use in labeling, cleaning and repairing a readable surface of a compact disk.

A number of patents have been issued relating to compact disk labeling systems for applying compact disk labels. These include U.S. Pat. Nos. 5,421,950, 5,783,033, 5,783,031, 5,902,446, and European Patent No. 0855713.

U.S. Pat. No. 5,421,950 discloses an "applicator tool for adhering a gummed label to a circular disk in concentric alignment with a center hole through the disk. The applicator tool has a blade portion and a handle portion. An alignment hub having a raised circular shoulder is disposed on one side of the blade portion and a projecting hub is disposed on the other blade surface. The shoulder and hub are aligned along an axis and the hub and are sized for insertion into the disk center hole".

U.S. Pat. No. 5,783,033 discloses a "compact disc labeling device for manually applying a label to a compact disc. The device includes an assembly having a circumferential flange with an upper flange surface, a piston, a first rod having a diameter approximately equal to the diameter of the label's central aperture and that extends from the upper surface of the piston, and a second rod having a diameter approximately equal to the diameter of the disc's central aperture and that extends from the first rod. In use, a label is placed on the flange with the first rod projecting through its central aperture and the disc positioned on the second rod through its central aperture. When the piston is moved from an upper first position to a lower second position, the disc is applied to the label".

U.S. Pat. No. 5,783,031 discloses a "device and a process for applying a label to a compact disk. The device is comprised of a two-level base with a post in the center of the base. A compact disc is slipped over the post and rests on the upper level of the base. A cap is then placed over the post which allows an annular paper label to be centered on the disc".

U.S. Pat. No. 5,902,446 discloses a "labeler for manually placing self-adhesive labels onto compact disks. The labeler has a positioning cone with an elongated stock member, a flat surface with a diameter greater than that of the elongated stock member, and a point on an end of the positioning cone opposed from the elongated stock member. The labeler also has a positioning plate with a positioning hole in the center, a surface area upon which a self-adhesive label can be placed and a side area to add strength to the positioning plate. The labeler further has a cylindrical base with a flat lip member upon which the positioning plate can rest substantially flat, a flat bottom to keep the cylindrical base substantially flat when used on a substantially flat surface, a wall to keep the flat lip member lifted substantially off of the substantially flat surface and a hollow cavern into which a substantial portion of the positioning cone can fit".

European Patent No. 0855713 discloses a "device having a sleeve with a reception element for the compact disc. A fixing element positions the compact disc and a cover element which is pivoted to the reception element and provided with a carrier element for a label on its inside. The carrier element has an adhesive layer for temporarily securing the label and is secured to the inside of the cover element via an adhesion element, with transfer of the label to the surface of the compact disc, upon closure of the sleeve".

The device disclosed in European Patent No. 0855713 has a sticky surface that holds the label prior to contact with the CD. The label is placed by hand around a target circle to locate the label, and the sticky surface holds the label, and then the lid is closed to apply the label to the CD.

Companies by the name of Stomper and Press-it market almost identical label applicators, and these applicators function in a manner similar to the device disclosed in U.S. Pat. No. 5,902,446, although they are made differently. The Stomper and Press-it devices have a base with a surface that holds an adhesive-backed label with the adhesive surface facing upward. A spring loaded central alignment member has a larger diameter lower portion, whose diameter matches that of the label. An upper portion has a smaller diameter that matches the diameter of the opening in the CD. The CD is placed over the upper portion and rests on a shelf (or shoulder region per U.S. Pat. No. 5,902,446) formed between the upper and lower portions of the alignment member. The CD is pressed downward against the tension of the spring, forcing the alignment member downward until the CD contacts the adhesive surface of the label.

Dynosys AG markets a Labelle™ CD labeling system. This system has a bottom casing (or base) containing a centered depressible knob referred to as a movable swimming centering knob. A lid that closes on the bottom casing contains a CD hub and a depressible button that moves the hub and CD towards the bottom casing. A label is placed in the casing bottom, and the movable swimming centering knob automatically aligns with the top centering core when the lid is closed. This aligns the label with the CD. When the lid is closed on the bottom casing and the depressible button in the center of the lid is pressed, the CD-ROM is lowered onto the aligned label disposed in the bottom casing. The movable swimming centering knob in the bottom casing is moved below the label when the depressible button in the center of the lid is pressed to contact the CD with the label.

A number of patents have been issued relating to compact disk cleaning systems that were uncovered in a computer-search of the U.S. Patent and Trademark Office patent database. These include U.S. Pat. No. 5,537,706 entitled "Compact disk cleaning system for cleaning multiple compact disks", U.S. Pat. No. 4,783,870 entitled "Compact disk cleaner", and U.S. Pat. No. 5,228,022 entitled "Battery operated compact disk cleaner".

U.S. Pat. No. 5,537,706 discloses a "compact disk cleaning system comprising a housing further comprising a base with a closeable cover, the base having a hollow interior and a plurality of circular apertures formed thereon, the cover having a plurality of cleaning plates coupled thereto and extended downwards therefrom with each cleaning plate alignable with a separate aperture when the cover is closed; a plurality of revolvable disk pedestals each disposed within the interior of the base and extended upwards within a separate aperature to define a seat adapted for holding a compact disk; an energizable disk pedestal actuation mechanism having an activated orientation for revolving the disk pedestals and a deactivated orientation for preventing such revolving; and a plurality of cleaning pads each securable over a cleaning plate; whereby when compact disks are placed upon the disk pedestals and the cover is closed to place the cleaning pads in contact with the compact disks, placing the actuation mechanism in the activated orientation allows the compact disks to be revolved and cleaned".

U.S. Pat. No. 4,783,870 discloses "cleaning apparatus for a compact disc" that comprises "a housing having a hingedly coupled base and cover; a drive wheel disposed in the base of the housing rotatably supporting the compact disc and having a first axis of rotation, a rotatable carrier fixed to the cover and having a second axis of rotation and further having a cleaning pad fastened thereto which is adapted to contact the surface of the compact disc to clean the same, and a drive element coupled to the drive wheel and the carrier for rotating the compact disc and cleaning pad at approximately the same speed".

U.S. Pat. No. 5,228,022 discloses a compact disk cleaner which includes "a base (12), a support table (14) rotatably mounted within the base for supporting a compact disk (16) thereon, an electric motor (18) having a shaft for rotating the support table and the compact disk within the base, a cover (22) hinged to the base and a mechanism carried on the underside of the cover for removing dust from the top surface of the compact disk, when the cover is closed over the base. The dust remover may include: a brush (30) and a fan (32) along with a removeable pan (34) including a filter (44); or a cleaning belt (62) with tracked rollers (56)".

U.S. patent application Ser. No. 09/507,190 filed Feb. 18, 2000, by the present inventor discloses a compact disk labeling system for use in applying an adhesive label to a surface of a compact disk. The compact disk labeling system comprises a side wall having a shape that substantially matches the exterior shape of the compact disk and which registers the compact disk. A flat shelf is formed a predetermined distance below an upper edge of the side wall that forms an upper cavity. The flat shelf has a central opening formed therein with a plurality of slots extending outward therefrom toward the side wall. A hub is formed on the flat shelf that comprises a plurality of tabs that extend away from a top surface of the flat shelf. The hub is sized to allow a central hole in the adhesive label to register thereto. The central opening and slots in the flat shelf allow the hub to flex.

It is an objective of the present invention to provide for a compact disk labeling, cleaning and repairing system for cleaning and repairing a surface of a compact disk that improves upon the prior art cleaning systems disclosed above. It is also an objective of the present invention to provide for a compact disk labeling, cleaning and repairing system that improves upon the invention disclosed in U.S. patent application Ser. No. 09/507,190.

SUMMARY OF THE INVENTION

To accomplish the above and other objectives, the present invention provides for improved compact disk labeling, cleaning and repairing systems. The compact disk labeling, cleaning and repairing systems are used to label, clean and repair a readable surface of a compact disk (CD) or digital video disk (DVD), for example.

An exemplary compact disk labeling system is used to apply an adhesive label to a surface of a compact disk. The exemplary compact disk labeling system has a side wall with a shape that substantially matches the exterior shape of the compact disk and which generally registers the compact disk. A flat shelf is formed a predetermined distance below an upper edge of the side wall that forms an upper cavity. A plurality of tabs are disposed around the periphery of the side wall that hold the compact disk above the label prior to application of the label thereto and which also register the compact disk. The flat shelf has a central cavity formed therein and a plurality of slots extending toward the side wall that form a plurality of tabs. A hub is provided that comprises a plurality of vertical projections that extend away from top surfaces of the tabs. The hub (the diameter of the outer edges of the plurality of tabs) is sized to allow a central hole in the adhesive label to register thereto. The slots in the flat shelf allow the tabs comprising the hub to flex.

In operation, the system is used to label a compact disk in the following manner. An adhesive label is placed over the tabs with its adhesive side exposed. The compact disk is placed in the cavity so that it is held by the plurality of tabs disposed around the periphery of the side wall and is generally registered by the tabs. The plurality of tabs hold the compact disk above the label prior to application of the label. The compact disk is pressed toward the flat shelf which moves the plurality of side wall tabs outward while the compact disk moves downward, and then depresses the tabs of the hub so that the compact disk contacts the adhesive side of the adhesive label to attach the adhesive label the compact disk.

An exemplary compact disk cleaning and repairing system comprises a side wall having a shape that substantially matches the exterior shape of the compact disk and which has a toothed gear-like edge. A flat shelf is formed a predetermined distance below an exposed edge of the side wall that forms a cavity in which the compact disk is placed. The flat shelf has one or more frictional pads that prevent motion of the compact disk during cleaning and repairing. A cleaning tool is provided that comprises a rotatable disk having an exterior toothed gear-like edge that mates with the toothed gear-like edge of the side wall. A handle is attached to the rotatable disk that permits rotation of the disk relative to the handle.

In operation, the system is used to clean a compact disk in the following manner. A compact disk is mounted on the applicator which has rubber like pads attached that prevent the compact disk from moving during cleaning. A few drops of cleaning solution are placed on the pad of the cleaning tool or directly onto the compact disk, and the tool is placed on the surface of the compact disk. A series of gear teeth (cutouts) are located on the inner rim of the applicator. A corresponding gear, or series of gear teeth, are disposed around the outer rim of the cleaning tool. The cleaning tool has a handle that snaps into a center hole and allows the cleaning tool to spin or rotate around the center hub of the handle. When the cleaning tool gear meshes with the corresponding gear teeth of the applicator, the cleaning tool rotates and cleans the compact disk in a radial fashion from the center of the compact disk outward. This is the prescribed or preferred method of cleaning, which is to rub in a direction that is across or transverse to the data tracks. A second method, unlike the just-described preferred method, does not require the gear teeth. A firm friction action between the cleaning tool and the inner rim of the applicator accomplishes the same function and performs a radial and effective cleaning action.

In operation, the system is used to repair a compact disk in the following manner. The compact disk is placed on the flat surface of the applicator. A few drops of the repair solution is placed on the area of the compact disk where a scratch or an abrasion is located. By using a mildly abrasive pad mounted to the bottom of the cleaning tool, and rubbing it over the damaged area, any marks, cuts, scratches or abrasions will be removed, making the compact disk usable again. This is accomplished by rounding off the edges of a scratch so the laser reader can read the data.

A preferred embodiment of the present invention integrates the compact disk labeling system with the cleaning and repairing system and is provided as part of a kit that includes supplies that are used to clean the surfaces of a compact disk as well as to repair any scratch or defect on the surface of the compact disk. The kit includes two bottles of solution (one for cleaning and one for repairing compact disk) that are used with the cleaning and repairing system.

Alternative embodiments of the present invention may use a cleaning tool that has a dimple instead of a handle, which is moved by a person's finger. Furthermore, alternative embodiments of the present invention may have a toothed gear-like edge on a central member instead of the inner surface of the outer side wall. Movement of the cleaning tool is performed by meshing the toothed gear-like edges of the cleaning tool and central member or by contacting respective frictional surfaces while moving the cleaning tool around the compact disk.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 2 is a top view of the system shown in FIGS. 1 and 1a;

FIG. 6 is a bottom view of the system shown in FIGS. 1 and 1a;

FIG. 7 is a bottom view of a cleaning tool used with the system shown in FIG. 1a;

DETAILED DESCRIPTION

Figure 1:
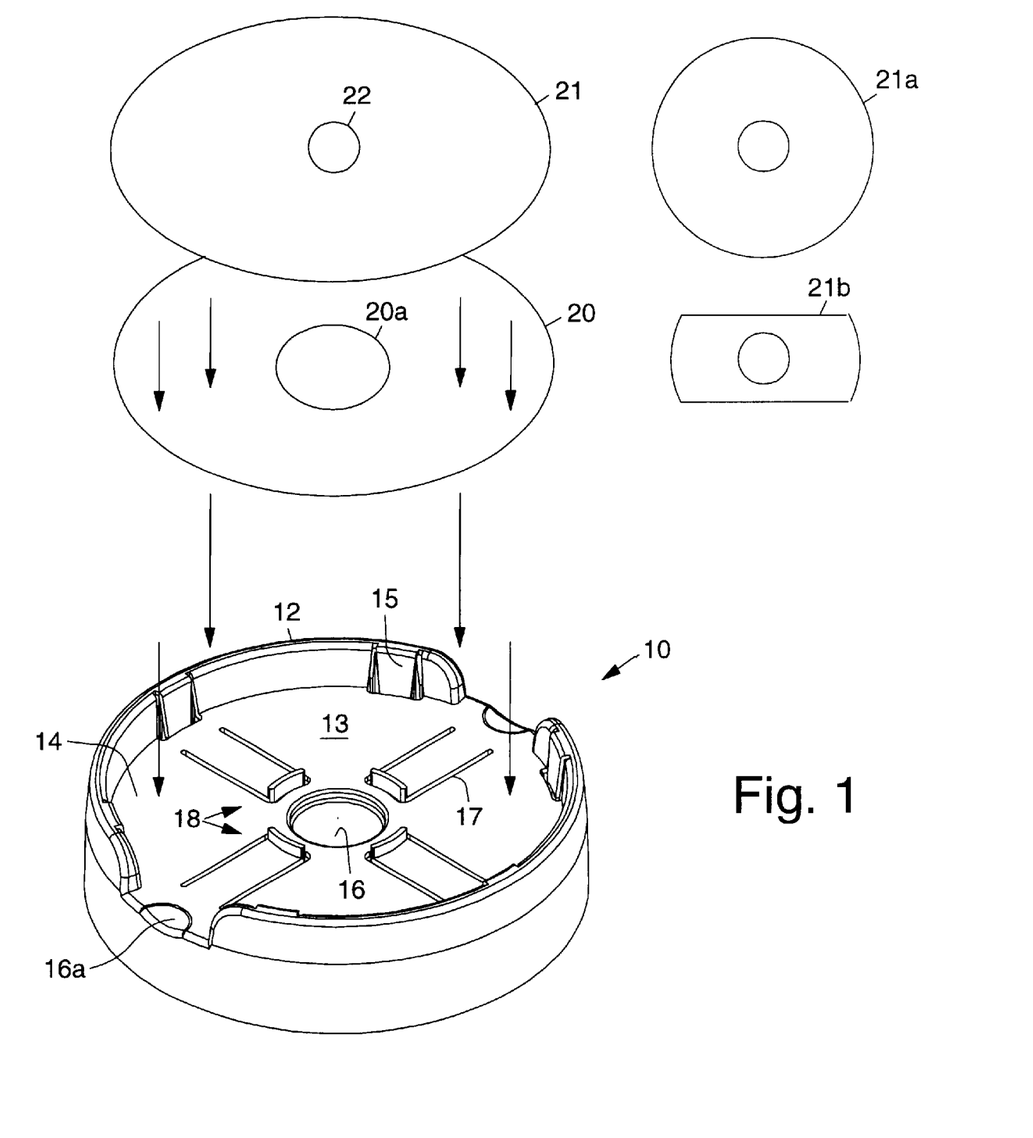
FIG. 1 illustrates a top exploded view of an exemplary embodiment of a compact disk labeling, cleaning and repairing system in accordance with the principles of the present invention.
Figure 1A:
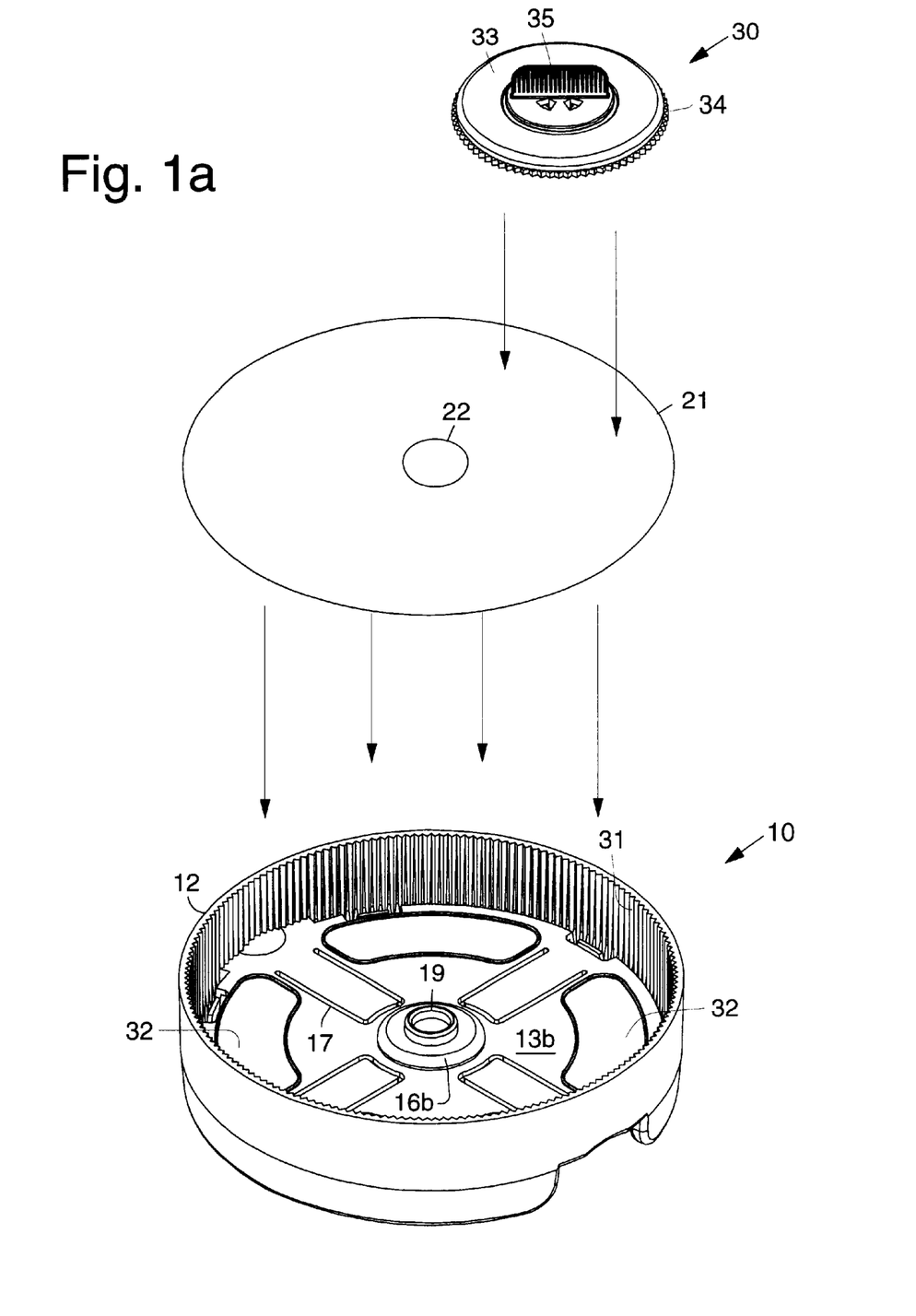
FIG. 1a illustrates a bottom exploded view of the system shown in FIG. 1 and illustrates the cleaning and repairing aspects of the present invention.

Referring to the drawing figures, FIG. 1 illustrates a top exploded view of an exemplary embodiment of a compact disk labeling, cleaning and repairing system 10 in accordance with the principles of the present invention. FIG. 1 illustrates the labeling aspects of the present invention. FIG. 1a illustrates a bottom exploded view of the exemplary system 10 and illustrates the cleaning and repairing aspects of the present invention. It is to be understood that the embodiments of the compact disk labeling system 10 and the cleaning and repairing system 10 may be separate or integrated into a single unit as shown.

The labeling system 10 may be used with a compact disk (CD) 21, recordable CD (CDR), recordable read-writable CD (CDRW), and digital video disk (DVD), and the like, and a CD label 20 that are used with it. Additional types of compact disks 21 known as a mini CD 21a and a CD card 21b may also be used with the labeling system 10 and are illustrated to the right side of FIG. 1. The CD label 20 has a central hole 20a disposed therein. Each of the compact disks 21, 21a, 21b also have a central opening 22 disposed therein.

Figure 2:
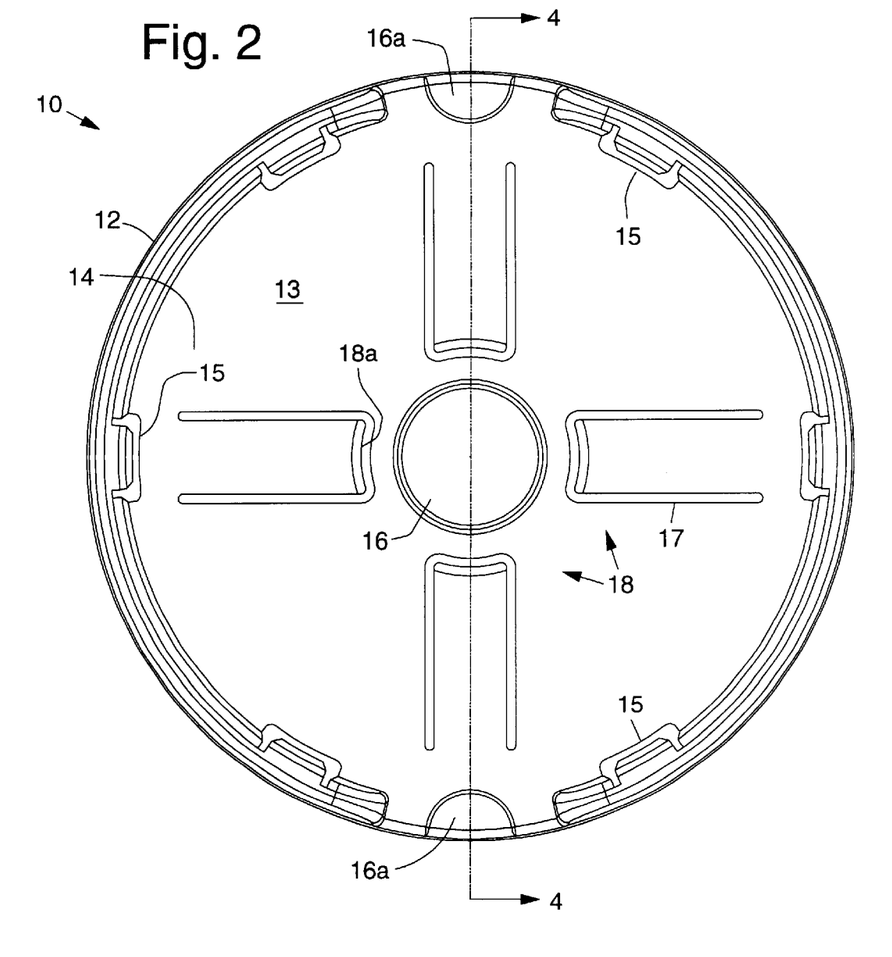
Figure 3:
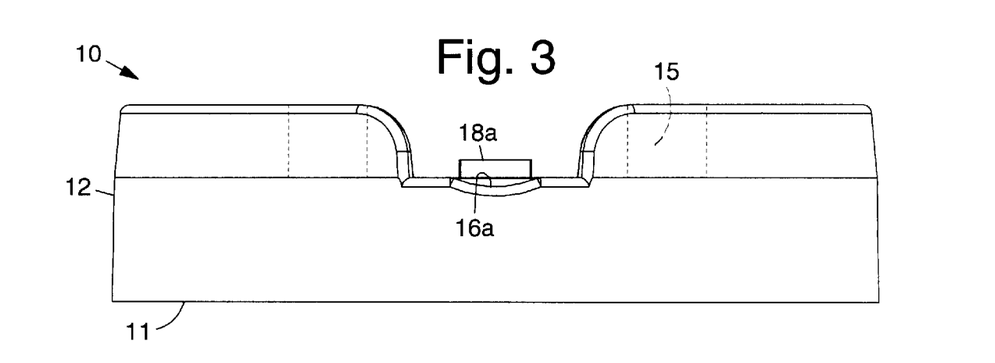
FIG. 3 is a side view of the system shown in FIG. 2.
Figure 4:
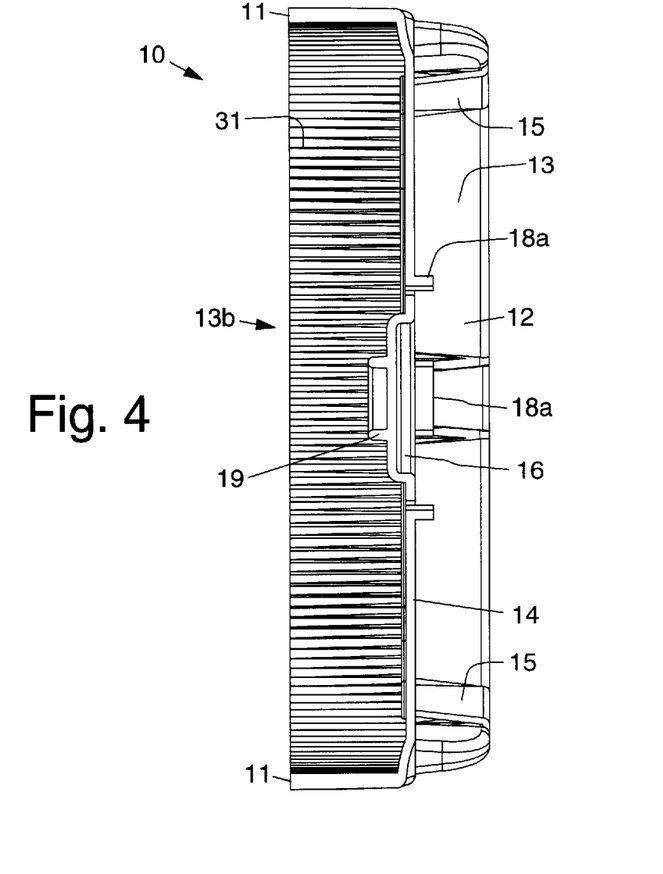
FIG. 4 is a cross-sectional side view of the system shown in FIG. 2 taken along the lines 4—4.
Figure 5:
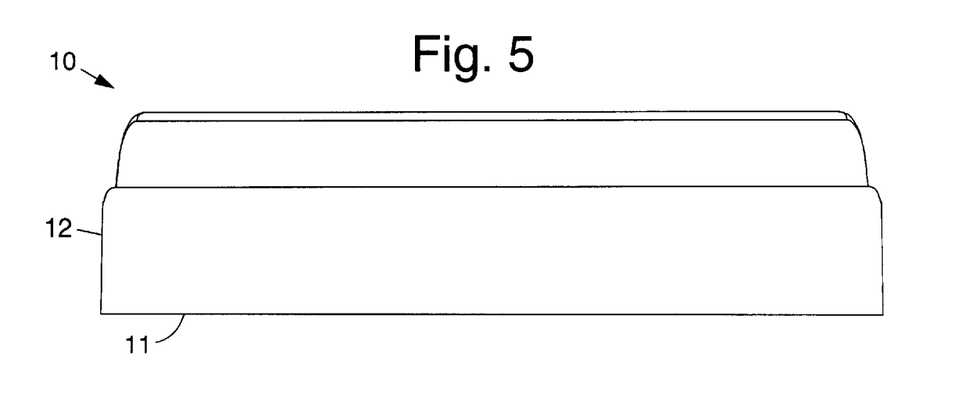
FIG. 5 is a side view of the system shown in FIG. 2 taken orthogonal to the view shown in FIG. 3.

FIG. 2 is a top view of the system 10 shown in FIGS. 1 and 1a. FIG. 3 is a side view of the system 10 shown in FIG. 2. FIG. 4 is a cross-sectional side view of the system 10 shown in FIG. 2. FIG. 5 is a side view of the system 10 shown in FIG. 2 taken orthogonal to the view shown in FIG. 3;

With reference to FIGS. 2–5, the compact disk labeling system 10 is preferably a molded as a single-piece plastic component. The exemplary compact disk labeling system 10 is shown as circular in shape. However, the perimeter of the compact disk labeling system 10 may have any shape.

The compact disk labeling system 10 has a circular outer side wall 12 with a lower edge 11 (FIG. 3) that contacts a surface on which the system 10 sits. The outer side wall 12 extends away from the lower edge 11 a predetermined distance. A flat shelf 14 is formed a predetermined distance below an upper edge of the outer side wall 12, which forms an upper cavity 13.

A plurality of downwardly extending bendable or movable tabs 15 having a diameter that is slightly smaller than the compact disk 21 are formed in the side wall 12. The plurality of tabs 15 disposed around the periphery of the side wall hold the compact disk 21 above the label 20 prior to application of the label 20 thereto and also register the compact disk 20. The tabs 15 move or flex outwardly when the compact disk 21 is pushed toward the label 20 to attach it. The tabs 15 may be rough or slick as long as they hold the compact disk 21 above the shelf 14 prior to depressing the compact disk 21 onto the label 20.

The flat shelf 14 has a central cavity 16 formed therein and has a plurality of U-shaped slots 17 extending away from the central cavity 16 toward the side wall 12. A plurality of external cavities 16a are provided that permit removal of the compact disk 21. A hub 18, formed by a plurality of tabs 18a that are portions of a circle, extend away from the top surface of the flat shelf 14. The outer diameter of the hub 18 is sized to allow the central hole 20a in the CD label 20 to tightly slide over it so that the CD label 20 can rest on the flat shelf 14. The hub 18 thus registers the CD label 20. The plurality of slots 17 formed in the flat shelf 14 allow the hub 18 to flex downwardly toward the surface on which the labeling system 10 sits.

When the compact disk labeling system 10 is designed to work with mini CD 21a and a CD card 21b, certain changes are made to the system 10 shown in FIG. 1. The shape of the cavity 13 surrounded by the inner side wall 12a is designed to have a shape that matches that of the mini CD 21a or CD card 21b. Also, the CD label 20 has a smaller central hole 20a that that of the regular CD 20. Consequently the diameter of the hub 18 is smaller, and locations of the tabs 15 are different, in the embodiment used with mini CDs 21a and CD cards 21b. Otherwise, the function is the same.

In operation, a CD label 20 is placed over the hub 18 (the tabs 18a) with its adhesive side 20b exposed so that it more-or-less rests on the flat surface, and is registered by the hub 18. The compact disk 21 is placed in the cavity 13 so that it is held and registered by the tabs 15. The compact disk 21 is then pressed downward toward the flat shelf 14 which slides the compact disk 21 along the tabs 15 and subsequently depresses the plurality of tabs 18a comprising the hub 18. The compact disk 21 thus contacts the adhesive side of the CD label 20 and is fully depressed so that it contacts the flat shelf 14, which attaches the CD label 20 to the surface of the compact disk 21. Inserting one's finger into the central cavity 16 and holding the system 10, such as by way of one of the external cavities 16a, allows the compact disk 21 to be removed from the system 10.

Figure 6:
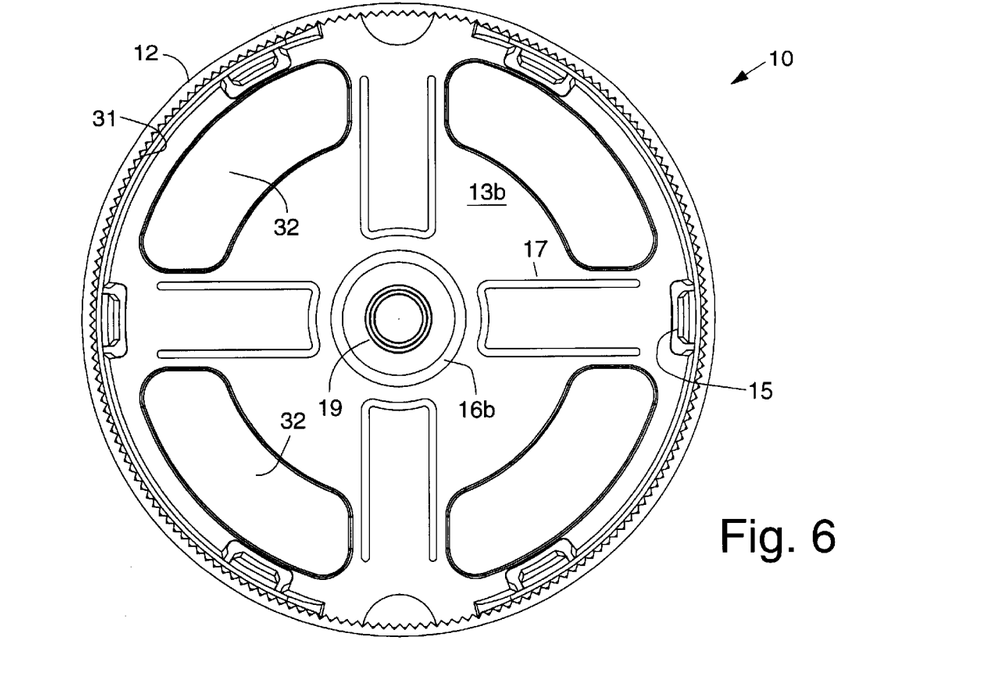
Figure 6A:
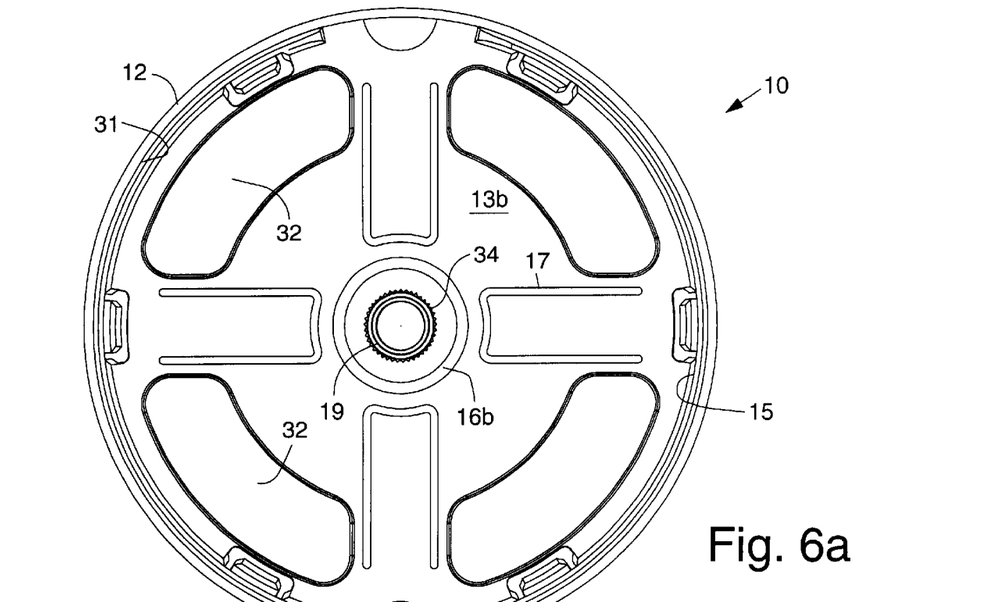
FIG. 6a is a bottom view of an alternative embodiment of the system.

FIG. 4 illustrates a cross-sectional side view of the system 10 shown in FIG. 2, and FIG. 6 is a bottom view of the system shown in FIGS. 1 and 1a. FIG. 6a is a bottom view of an alternative embodiment of the system. These figures illustrate cleaning and repairing aspects of the present invention.

As is shown in FIGS. 4 and 6, the bottom portion of the system 10 comprises a lower cavity 13b formed between the inner edge of the side wall 12 and a lower surface of the flat shelf 14. At least a portion of the inner edge of the side wall 12 adjacent to the lower cavity 13b comprises a toothed gear-like surface 31 (or frictional surface 31) that is disposed around the periphery of the inner edge of the side wall 12. The toothed gear-like surface 31 or frictional surface 31) is used in conjunction with a cleaning tool 30 (FIGS. 7–10) to clean and repair a surface of a compact disk 21. A ring 19 (or central member 19) extends from the lower surface of the shelf 14 that is used to hold the cleaning tool 30 during storage.

The lower surface of the flat shelf 14 has one or more frictional pads 32 disposed thereon (or in cavities formed therein) that prevent movement of the compact disk 21 when cleaning or repairing the compact disk 21. The frictional pads 32 may be made of a rubber or rubber-like material such a neoprene, for example, and may be glued or otherwise secured to the lower surface of the flat shelf 14.

Figure 7:
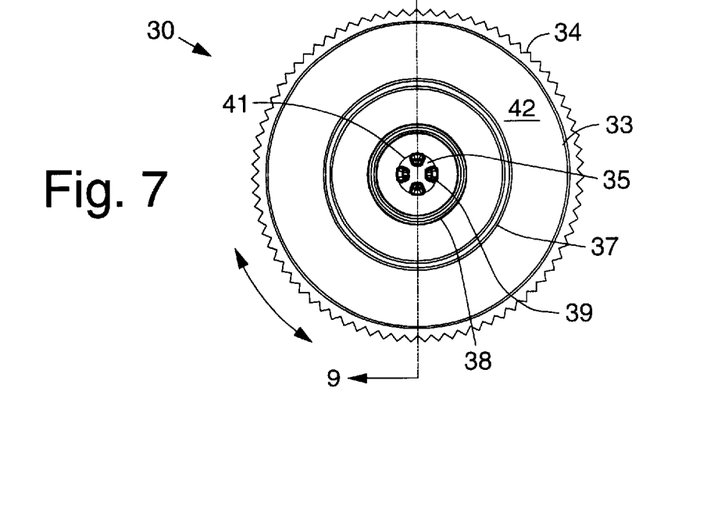
Figure 8:
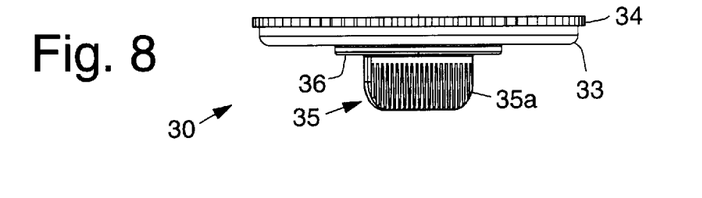
FIG. 8 is a side view of the cleaning tool shown in FIG. 7.
Figure 9:
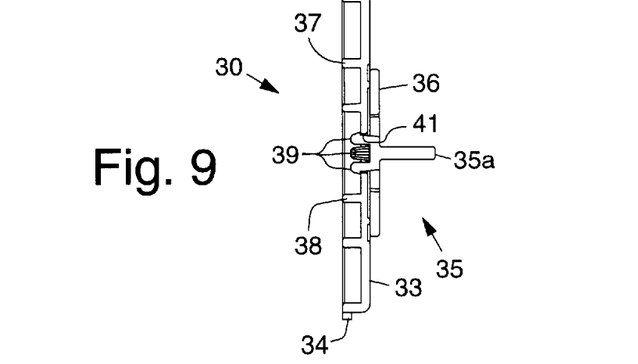
FIG. 9 is a cross-sectional side view of the cleaning tool shown in FIG. 7 taken along the lines 9—9.

FIG. 7 is a bottom view of a first embodiment of the cleaning tool 30 used with the system 10 shown in FIG. 1a. FIG. 8 is a side view of the cleaning tool 30. FIG. 9 is a cross-sectional side view of the cleaning tool 30 shown in FIG. 7 taken along the lines 9—9.

The cleaning tool 30 shown in FIGS. 7–9 comprises a circular disk 33 that is rotatably attached to a handle 35. An outer edge of the circular disk 33 comprises a toothed gear-like surface 34 that mates with the toothed gear-like surface 31 on the inner edge of the side wall 12. Alternatively, it may comprise a smooth or frictional surface 34 that contacts the inner edge of the side wall 12 during use and move as a result of frictional contact between the respective surfaces. The circular disk 33 is attached to the handle 35 using a plurality of tabs 39 (forming a central hub 39) that are inserted into a hole 41.

Figure 10:
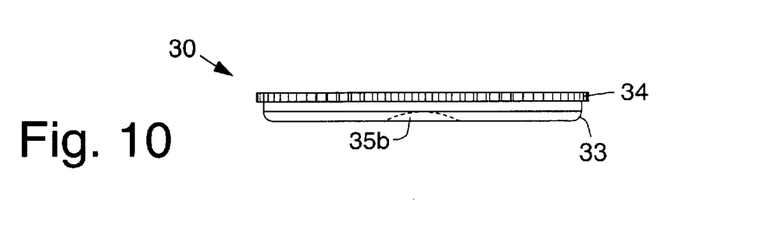
FIG. 10 a side view of an alternative embodiment of the cleaning tool.

FIG. 10 a side view of an alternative embodiment of the cleaning tool 30. This alternative embodiment of the cleaning tool 30 does not have a handle 35, but has a dimple 35b formed in the center of the top surface of the circular disk 33. A user places his or her finger in the dimple 35b and moves the cleaning tool 30 around the compact disk 21 by means of the meshed toothed gear-like surfaces 31, 34 (or frictional surfaces 31, 34).

FIG. 6a is a bottom view showing an alternative embodiment of the system 10. In this alternative embodiment, the toothed gear-like surface 31 or frictional surface 31) is not on the inner surface of the side wall 12, but is located around the outer peripheral edge of the ring 19 (or central member 19). Operation of the cleaning tool 30 in conjunction with this alternative embodiment is substantially the same as with the first embodiment, in that the cleaning tool 30 is moved around the surface of the compact disk 21 by meshing the respective toothed gear-like surfaces 31, 34 or frictional surfaces 31, 34, and moving the cleaning tool 30 using one's finger.

A lower surface of the circular disk 33 has an inner raised ring 38 extending from the surface that mates with the ring 19 (or central member 19) on the lower surface of the shelf 14 to attach the cleaning tool 30 to the system for storage. The lower surface of the circular disk 33 also has an outer raised ring 37 extending from the surface that is used to captivate a cleaning pad 42 between it and the outer edge of the circular disk 33.

The handle 35 has a flat portion 35a or tab 35a that is held by a user and a circular portion 36 that abuts an upper surface of the circular disk 33. The circular portion 36 keeps the user's fingers from contacting the rotating disk 33 when cleaning or repairing the compact disk 21 to prevent friction burns.

In operation, the system 10 is used to clean a compact disk 21 in the following manner. A compact disk 21 is inserted into the lower cavity 13b so that it contacts the frictional (rubber-like) pads 32 that prevent the compact disk 21 from moving during cleaning. A few drops of cleaning solution are placed on the cleaning pad 42 of the cleaning tool 30 or directly onto the compact disk 21, and the tool 30 is placed on the surface of the compact disk 21.

The handle 35 of the cleaning tool 30 snaps into the central hole 41 and allows the circular disk 33 to spin or rotate around the central hub 39 (comprising the plurality of tabs 39) of the handle 35. The gear-like teeth 31 located on the inner surface of the side wall 12 mate with the corresponding gear teeth 34 disposed around the outer rim of the cleaning tool 30.

Because the gear teeth 34 of the cleaning tool 30 mesh with the corresponding gear teeth 31, movement of the handle 35 rotates the cleaning tool 30 and cleans the compact disk 21 in a radial fashion from the center of the compact disk 21 outward. This is the prescribed or preferred method of cleaning, the compact disk 21, which is to rub in a direction that is across or transverse to its data tracks.

Alternatively, firm friction action between the smooth or frictional surface 34 of the cleaning tool 30 and the inner frictional surface 31 of the side wall 12 accomplishes the same function as the complementary gear-toothed version and performs a radial and effective cleaning action.

In operation, the system 10 is used to repair a compact disk 21 in the following manner. The compact disk 21 is disposed on the lower surface of the flat shelf 14 on the one or more frictional pads 32. A few drops of the repair solution is placed on the area of the compact disk 21 where a scratch or an abrasion is located. By using the cleaning tool containing a mildly abrasive cleaning pad 42 mounted to the bottom, and rubbing it over the damaged area, any marks, cuts, scratches or abrasions will be removed, making the compact disk 21 usable again. This is accomplished by rounding off edges of a scratch so that a compact disk reader can read the data.

Thus, improved compact disk labeling, cleaning and repairing systems for labeling, cleaning and repairing a compact disk have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A compact disk labeling system for use in applying an adhesive label to a compact disk, comprising:

a side wall having a shape that substantially matches the exterior shape of the compact disk;

a substantially flat shelf formed a predetermined distance below an upper edge of the side wall that forms an upper cavity that has a central opening formed therein and a plurality of slots extending outward therefrom toward the side wall, and upon which an adhesive label is placed with its adhesive side up;

a plurality of tabs disposed around the periphery of the side wall that hold the compact disk above the label prior to application of the label thereto; and a hub comprising a plurality of tabs that extend away from a top surface of the flat shelf toward the upper edge of the side wall, which hub is sized to allow a central hole in the adhesive label to register thereto, and wherein the slots in the flat shelf allow the hub to flex.

2. The system recited in claim 1 which is a single-piece molded plastic component.

3. The system recited in claim 1 further comprising:

a lower cavity formed between the side wall and a lower surface of the flat shelf, which side wall comprises a frictional surface;

one or more frictional pads disposed on the lower surface of the flat shelf that prevent movement of the compact disk; and a cleaning tool comprising a rotatable cleaning member having a cleaning pad disposed thereon that contacts the compact disk, which rotatable cleaning member contacts and rotates relative to the frictional surface of the side wall to clean the compact disk.

4. The system recited in claim 1 further comprising:

a lower cavity formed between the side wall and a lower surface of the flat shelf, a frictional surface formed on a peripheral edge of a central member that protrudes into the lower cavity;

one or more frictional pads disposed on the lower surface of the flat shelf that prevent movement of the compact disk; and a cleaning tool comprising a rotatable cleaning member having a cleaning pad disposed thereon that contacts the compact disk, which rotatable cleaning member contacts and rotates relative to the frictional surface of the peripheral edge of the central member to clean the compact disk.

5. The system recited in claim 1 further comprising:

a lower cavity formed between the side wall and a lower surface of the flat shelf, which side wall comprises a toothed gear-like surface; and one or more frictional pads disposed on the lower surface of the flat shelf that prevent movement of the compact disk; and a cleaning tool comprising a rotatable cleaning member having a cleaning pad disposed thereon that contacts the compact disk, and whose outer edge comprises a toothed gear-like surface that mates with the toothed gear-like surface of the side wall and rotates relative to the compact disk to clean it.

6. The system recited in claim 1 further comprising:

a lower cavity formed between the side wall and a lower surface of the flat shelf; and one or more frictional pads disposed on the lower surface of the flat shelf that prevent movement of the compact disk;

a central member that protrudes into the lower cavity that has a toothed gear-like peripheral edge; and a cleaning tool comprising a rotatable cleaning member having a cleaning pad disposed thereon that contacts the compact disk, and whose outer edge comprises a toothed gear-like surface that mates with the toothed gear-like peripheral edge of the central member and rotates relative to the compact disk to clean it.

7. The system recited in claim 3 wherein the cleaning tool comprises a handle coupled to the rotatable cleaning member.

8. The system recited in claim 3 wherein the cleaning tool comprises a dimple formed in the rotatable cleaning member that allows the cleaning tool to rotate in conjunction with movement of one's finger.

* * * * *